M. HVEEM.
COMBINATION HYDRAULIC TRANSMISSION CLUTCH AND BRAKE.
APPLICATION FILED AUG. 28, 1916.
1,256,696.
Patented Feb. 19, 1918.
2 SHEETS—SHEET 1.
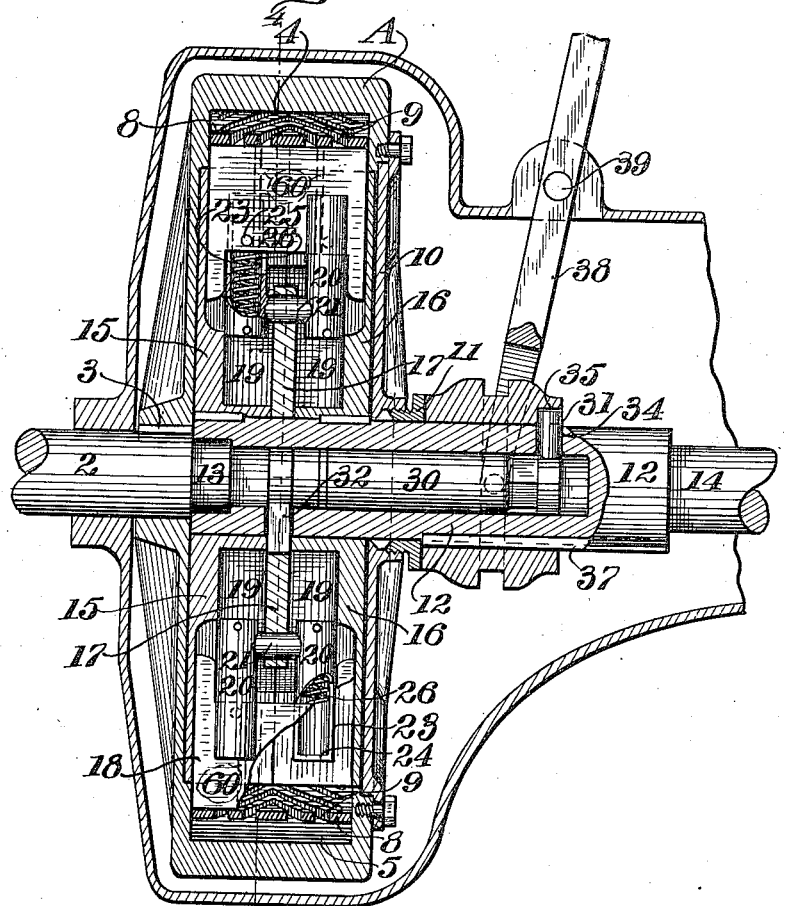
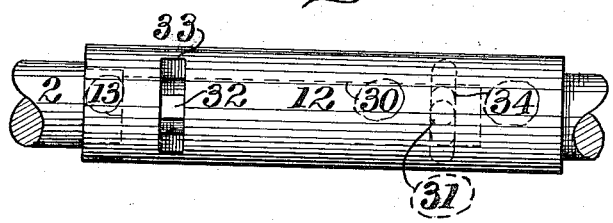
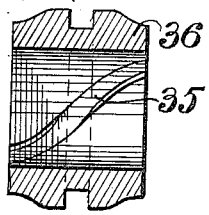
WITNESSES:
INVENTOR
Martin Hveem.
BY Strong & Townsend
ATTORNEYS M. HVEEM.
COMBINATION HYDRAULIC TRANSMISSION CLUTCH AND BRAKE.
APPLICATION FILED AUG. 28, 1916.
1,256,696.
Patented Feb. 19, 1918.
2 SHEETS—SHEET 2.
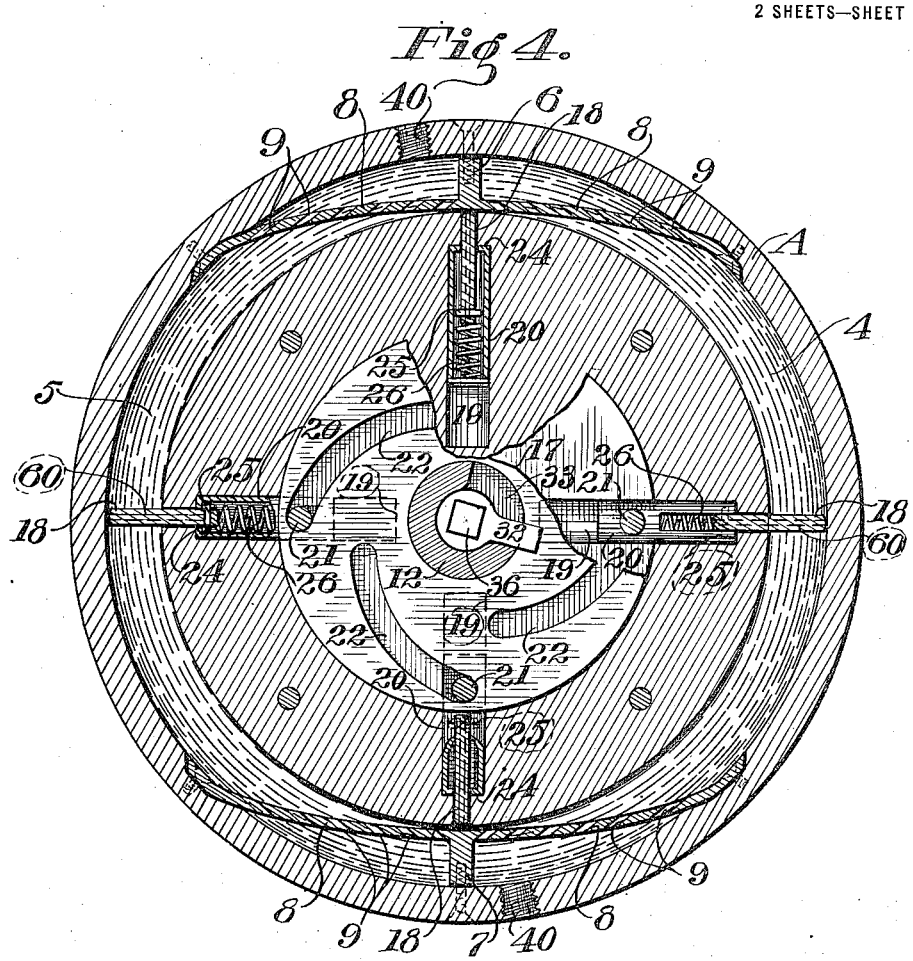
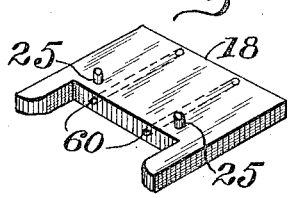
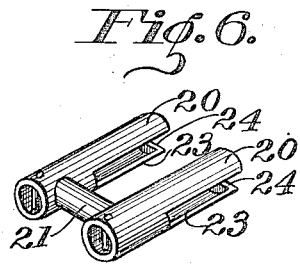
WITNESSES:
INVENTOR
Martin Hveem.
BY Strong & Townsend
ATTORNEYS

UNITED STATES PATENT OFFICE.

MARTIN HVEEM, OF BAYLES, CALIFORNIA.

COMBINATION HYDRAULIC TRANSMISSION CLUTCH AND BRAKE.

1,256,696.   Specification of Letters Patent.   Patented Feb. 19, 1918.

Application filed August 28, 1916. Serial No. 117,192.

*To all whom it may concern:*

Be it known that I, MARTIN HVEEM, a citizen of the United States, residing at Bayles, in the county of Shasta and State of California, have invented new and useful Improvements in Combination Hydraulic Transmission Clutches and Brakes, of which the following is a specification.

This invention relates to a combination hydraulic transmission clutch and brake.

One of the objects of the present invention is to provide a simple, compact and easily operated hydraulic transmission for automobiles and the like, through which a direct or variable speed may be transmitted to the propeller shaft of a car.

Another object of the invention is to provide a transmission of the character described, which is also adapted as a clutch and brake.

The invention further consists of the novel construction, combination and arrangement of parts as will hereinafter be more fully described and claimed, having reference to the accompanying drawing in which:

Figure 1 is a central, vertical, longitudinal section of the device.

Fig. 2 is a detailed view of the secondary shaft.

Fig. 3 is a detailed view and section of the shifting collar.

Fig. 4 is a vertical section taken through Fig. 1, on line 4—4, portions being omitted.

Fig. 5 is a perspective view of one of the vanes.

Fig. 6 is a perspective view of one of the vane holders.

Referring to the drawings in detail A indicates a flywheel or casing which is adapted to be secured on the end of an engine crank shaft 2 by means of a key 3 or any other suitable means. Formed interior of the flywheel is an annular passage which in this instance is divided into two compartments 4 and 5 by means of a pair of heads 6 and 7. Formed integral with the heads 6 and 7 and extending into the annular passage on either side of the heads, is a pair of cam plates 8, which are provided with V shaped slots 9, the function of which will hereinafter be described.

Secured to the outer face of the flywheel is a cover plate 10 and extending through a stuffing box 11 formed in said side plate is a secondary shaft 12. This shaft is hollow and is turnable entirely independent of the engine crank shaft 2. The shaft is preferably recessed at one end to permit the outer end 13 of the crank shaft to extend into the secondary shaft and form a bearing for the same. The opposite end of the secondary shaft may be mounted in a bearing not here shown and may be suitably connected to the propeller shaft 14.

Secured upon the secondary shaft 12 within the fly wheel is a secondary wheel which is made in two sections such as indicated at 15 and 16, and turnably mounted upon the secondary shaft in a space formed between the two sections 15 and 16 is a disk 17. Formed in the periphery of the secondary wheel are a plurality of radially disposed slots in which are mounted vanes 18. These vanes are adapted to be projected into the annular passage formed interior of the flywheel and are similarly adapted to be retracted therefrom by means of the central disk 17 and other coöperating members hereinafter to be described.

Formed in the secondary wheel and radially disposed are a plurality of cylindrically shaped openings 19. These openings are arranged in pairs and are provided for the purpose of receiving vane holders, such as shown in Fig. 6. These holders consist of two tubular members 20, which are connected at the lower end by means of a cross-pin 21. The cross-pin extends through a coöperating cam slot 22 formed in central disk 17, and as there are four sets of vanes 18 shown in the present device, it can readily be seen that there will be four holders such as is shown in Fig. 6, and four sets of cam slots 22. The upper end of each vane holder or tube 20 is slotted as at 23 to permit the tubes to straddle the coöperating vane. The upper end of each tube is provided with inwardly turned projections 24 which are adapted to engage with pins 25 secured in the vanes proper, to retract the vanes from the annular passage formed in the flywheel. Interposed between the bottom of each tube and the vane is a coil spring 26, there being two for each vane. These springs serve the function of a resilient support for each individual vane, therefore permitting each individual vane to be depressed with relation to its holder without changing the position of the holder,—this being necessary, as the vanes during each rotation of the secondary wheel engage with the cam plates 8. The holders proper are, however, adapted to be reciprocated within the secondary wheel by means of the central disk 17, the crosspin 21 and the cam slots 22 formed in the central plate. This is accomplished by turning the plate in the following manner:

Mounted interiorly of the hollow secondary shaft 12 is a shaft 30. This shaft is provided with an outwardly projecting crank arm at each end, such as indicated at 31 and 32. The crank arm 32 projects through a radially disposed slot 33 and into a notch formed in the disk 17 to make a positive connection between the shaft 30 and the disk; the length of the slot 33 being such as to permit an approximate quarter turn of the disk. The opposite crank arm 31 is similarly projected through a radially disposed slot 34 formed in the shaft on the other end, said arm being sufficiently extended to engage a cam slot 35 formed in the inner face of a shifting collar 36, which is slidably mounted as at 37 upon the outer end of the secondary shaft. A shifting lever 38 pivotally mounted as at 39, being provided for the purpose of sliding the shifting collar upon the shaft.

In actual practice the operation of the device will be as follows:

The annular passage formed interior of the flywheel or casing A is filled with a liquid such as oil or the like, through plugged openings such as indicated at 40. This liquid is retained in the annular passage by the centrifugal action of the flywheel A which is secured directly upon the engine crank shaft 2. It is furthermore prevented from leaking out, as the inner secondary wheel, together with the shaft supporting same, forms a filler interior of the flywheel, which practically speaking, restricts the liquid or maintains it within the annular passage. With the engine started and the flywheel rotating it is only necessary to move the shifting collar in one direction or another to permit the cam groove 35 to engage the upper end of the crank arm 31 and turn the inner shaft 30. This movement is transmitted through crank arm 32 to turn disk 17, which in turn either projects or retracts the vanes 18 in unison. If the car is standing still it is only necessary to move the vanes outwardly a slight distance. The liquid revolving with the flywheel A will then impinge on the projecting faces of the vanes, thereby transmitting power to rotate the secondary wheel and attached shaft 12.

As the speed of the car increases it is possible to gradually project the vanes until they are fully projected, as shown in Fig. 4. And practically speaking, positive drive is in this manner formed and the secondary wheel together with the connecting shaft, will turn in unison with the flywheel and engine shaft 2. Variable speeds are however possible as a slight retraction of the vanes will permit the liquid to pass by the vanes and circulate through the V shaped slots 9 formed in the cam plates 8. This will be more fully understood by the following description:

Upon rotating the flywheel it will be seen that the liquid contained in the annular chambers will also turn in the same direction. This is due not only to the centrifugal action imparted but also to the provision of the heads 6 and 7. If the vanes 18 are only partly projected it can readily be seen that the liquid will circulate past the vanes and through the V shaped slots formed in the cam plates. This circulation is gradually restricted as the vanes are projected and similarly unrestricted when the vanes are retracted. The cam plates provided are essential features of the present invention, as the vanes may be automatically retracted during each revolution, particularly when variable speeds are being transmitted. The resilient cushion provided by the springs 26 permit this automatic depression or retraction of each individual vane when the parts are revolving at variable speeds and the position of the vane holders at the same time limits the distance the vanes project during each revolution.

The hydraulic transmission here shown not only permits practically any speed desired to be transmitted without varying the engine's speed, but it also serves the function of a clutch. The clutch action here secured is ideal, as the gradual projection of the vanes permits power to be transmitted to the propeller shaft without any shock or undue strain upon the connected parts.

The device may furthermore be used as a brake when coasting down hill, as the power of the motor may be turned off and the vanes projected, in this manner causing the rear wheels of the car to transmit power to turn the engine when coasting. This is an ideal condition, as it practically eliminates wear and tear on the brakes now commonly employed.

Another important feature obtained by the present device is the economical running of the motor, as the motor may by application of this device be run at a constant economical speed, while the transmission permits any speed to be transmitted to the rear driving wheels; in fact, it permits the driver to adjust the car speed to the motor speed by gradually changing the ratio between the motor speed and the car speed, so as to maintain a maximum motor power instead of throttling the motor to reduce the speed to suit the gear ratios now commonly used.

The device as a whole is simple and substantial in construction and when applied as here shown it positively eliminates the use of a flywheel and clutch and transmission gears. It furthermore serves the function of a brake, and while it does not entirely replace the brake, it does to a great extent relieve the necessity of applying the brake, particularly when coasting down hill. The whole control of the device is obtained by the employment of a single lever, such as indicated at 38, and practically anyone, whether skilled or unskilled in the operation of driving, will be able to handle a car without previous experience or instructions.

The materials and finish of the several parts of the device may be such as the experience and judgment of the manufacture may dictate.

In the actual operation of the device it sometimes happens that the liquid contained in the annular chamber leaks back by the vanes and collects behind same. For the purpose of permitting the vanes to move freely back and also for the purpose of returning this leakage liquid back to the annular chamber a pair of return ports 60 have been provided. These ports permit the liquid to return back to the annular chamber, therefore permitting each individual vane to move freely back when manually retracted or when depressed by the cam plates. While any suitable form of liquid may be employed, I prefer a liquid having a heavy specific gravity and in some instances forming a liquid compound either by adding white lead, graphite or like material.

Having thus described my invention, what I claim and desire to secure by Letters Patent is:—

1. A hydraulic transmission comprising a hollow, liquid-containing fly wheel, a secondary wheel rotatable within the chamber of the fly wheel, a shaft for each wheel, yieldably mounted vanes carried by and extending from the periphery of the secondary wheel, spaced head members fixed radially within the fly wheel outwardly of the secondary wheel and each having oppositely extending perforated cam plates integral with the inner edge of the head over which the vanes are movable, said cam plates having their outer ends supported on the fly wheel, being unsupported between their ends, and a filling opening adjacent each head beneath a cam plate.

2. A hydraulic transmission comprising a hollow, liquid-containing fly wheel, a secondary wheel rotatable within the chamber of the fly wheel, a shaft for each wheel, yieldably mounted vanes carried by and extending from the periphery of the secondary wheel, and a head member fixed radially within the fly wheel outwardly of the secondary wheel and having perforated cam plates extending in opposite directions from the inner edge of said head for guiding the vanes over the latter.

3. A hydraulic transmission comprising a hollow, liquid-containing fly wheel rotatably mounted, a secondary wheel rotatable within the chamber of the fly wheel and provided with radially disposed openings, means within the chamber for obstructing the annular passage about the periphery of the secondary wheel, a longitudinally slotted tubular member slidable in each wheel opening, means for sliding the member radially of the secondary wheel, and a vane for each tubular member resiliently disposed in the slot thereof to extend beyond the periphery of said secondary wheel.

4. A hydraulic transmission comprising a hollow, liquid-containing fly wheel rotatably mounted, a secondary wheel rotatable within the chamber of the fly wheel and provided with radially disposed openings, means within the chamber for obstructing the annular passage about the periphery of the secondary wheel, a longitudinally slotted tubular member slidable in each wheel opening, means for sliding the members radially of the secondary wheel, a vane for each tubular member arranged in the slot thereof to extend beyond the periphery of the secondary wheel, and spring means housed by the tubular members to yieldably project the vanes.

5. A hydraulic transmission comprising a hollow, liquid-containing fly wheel rotatably mounted, a secondary wheel rotatable within the chamber of the fly wheel and provided with radially disposed openings, means within the chamber for obstructing the annular passage about the periphery of the secondary wheel, a longitudinally slotted tubular member slidable in each wheel opening, means for sliding the members radially of the secondary wheel, and a vane for each tubular member interlockingly and resiliently disposed in the slot thereof to extend beyond the periphery of said secondary wheel.

6. A hydraulic transmission comprising a hollow, liquid-containing fly wheel rotatably mounted, a secondary wheel rotatable within the chamber of the fly wheel and provided with radially disposed openings, means within the chamber for obstructing the annular passage about the periphery of the secondary wheel, a longitudinally slotted tubular member slidable in each wheel opening, means for sliding the members radially of the secondary wheel, a vane for each tubular member arranged in the slot thereof to extend beyond the periphery of the secondary wheel, means urging the vanes radially outward, and a pin on each vane extending into the respective tubular member for engaging therewith to limit the outward movement of the vane.

7. A hydraulic transmission comprising a hollow, liquid-containing fly wheel rotatably mounted, a shaft, a secondary wheel on the shaft rotatable within the chamber of the fly wheel and consisting of a pair of sections secured together, means within the chamber for obstructing the annular passage about the periphery of the secondary wheel, each wheel section having a radially disposed opening opposing that of the other section, said secondary wheel having transverse peripheral slots radially of the openings of the wheel sections, pairs of tubular members slidable in the opposing openings of the wheel sections and slotted at their outer ends in registry with the wheel slots, a pin connecting the tubular members of each pair, vanes disposed in the peripheral wheel slots and tubular member slots, and means engaging the connecting pins for sliding the tubular members.

8. A hydraulic transmission comprising a hollow, liquid-containing fly wheel rotatably mounted, a shaft, a secondary wheel on the shaft rotatable within the chamber of the fly wheel and consisting of a pair of sections secured together, means within the chamber for obstructing the annular passage about the periphery of the secondary wheel, each wheel section having a radially disposed opening opposing that of the other section, said secondary wheel having transverse peripheral slots radially of the openings of the wheel sections, pairs of tubular members slidable in the opposing openings of the wheel sections and slotted at their outer ends in registry with the wheel slots, a pin connecting the tubular members of each pair, vanes disposed in the slots of the wheel and tubular member, and cam means engaging the connecting pins for sliding the tubular members.

9. A hydraulic transmission comprising a hollow, liquid-containing fly wheel rotatably mounted, a shaft, a secondary wheel on the shaft rotatable within the chamber of the fly wheel and consisting of a pair of sections secured together, means within the chamber for obstructing the annular passage about the periphery of the secondary wheel, each wheel section having a radially disposed opening opposing that of the other section, said secondary wheel having transverse peripheral slots radially of the openings of the wheel sections, pairs of tubular members slidable in the opposing openings of the wheel sections and slotted at their outer ends in registry with the wheel slots, a pin connecting the tubular members of each pair, resiliently supported vanes slidable in the slots of the wheel and tubular members and having connection with the latter, and means for sliding the tubular members.

10. A hydraulic transmission comprising a hollow, liquid-containing fly wheel rotatably mounted, a shaft, a secondary wheel on the shaft rotatable within the chamber of the fly wheel and consisting of a pair of sections secured together, means within the chamber for obstructing the annular passage about the periphery of the secondary wheel, each wheel section having a radially disposed opening opposing that of the other section, said secondary wheel having transverse peripheral slots radially of the openings of the wheel sections, pairs of tubular members slidable in the opposing openings of the wheel sections and slotted at their outer ends in registry with the wheel slots, a pin connecting the tubular members of each pair, springs arranged in each tubular member, vanes slidably disposed in the slots of the wheel and tubular members and seating on the springs, and means for sliding the tubular members.

11. A hydraulic transmission comprising a hollow, liquid-containing fly wheel rotatably mounted, a shaft, a secondary wheel on the shaft rotatable within the chamber of the fly wheel and consisting of a pair of sections secured together, means within the chamber for obstructing the annular passage about the periphery of the secondary wheel, each wheel section having a radially disposed opening opposing that of the other section, said secondary wheel having transverse peripheral slots radially of the openings of the wheel sections, pairs of tubular members slidable in the opposing openings of the wheel sections and slotted at their outer ends in registry with the wheel slots, a pin connecting the tubular members of each pair, springs arranged in each tubular member, vanes slidably disposed in the slots of the wheel and tubular members and seating on the springs, a disk rotatably interposed between the wheel sections and provided with cam surfaces engaging the connecting pins, and means for imparting rotary movement to the disk.

12. A hydraulic transmission comprising a hollow, liquid-containing fly wheel rotatably mounted, a shaft, a secondary wheel rotatable within the chamber of the fly wheel and consisting of a pair of sections secured together, means within the chamber for obstructing the annular passage about the periphery of the secondary wheel, each wheel section having a radially disposed opening opposing that of the other section, said secondary wheel having transverse peripheral slots radially of the openings of the wheel sections, pairs of tubular members slidable in the opposing openings of the wheel sections and slotted at their outer ends in registry with the wheel slots, a pin connecting the tubular members of each pair, springs arranged in each tubular member, vanes slidably disposed in the slots of the wheel and tubular members and seating on the springs, a disk rotatable on the shaft and between the wheel sections and the component tubular members of each pair, said disk having cam slots through which the connecting pins pass, and means for rotating the disk.

13. A hydraulic transmission comprising a hollow, liquid-containing fly wheel rotatably mounted, a shaft, a secondary wheel rotatable within the chamber of the fly wheel and consisting of a pair of sections secured together, means within the chamber for obstructing the annular passage about the periphery of the secondary wheel, each wheel section having a radially disposed opening opposing that of the other section, said secondary wheel having transverse peripheral slots radially of the openings of the wheel sections, pairs of tubular members slidable in the opposing openings of the wheel sections and slotted at their outer ends in registry with the wheel slots, a pin connecting the tubular members of each pair, springs arranged in each tubular member, vanes slidably disposed in the slots of the wheel and tubular members and seating on the springs, a disk rotatable on the shaft and between the wheel sections and the component tubular members of each pair, said disk having cam slots through which the connecting pins pass, a second shaft within the first shaft having a pair of radial arms operating through slots in said first shaft, one arm being connected to the disk for rotating the same, and a collar slidable on the first shaft and provided with a spiral groove for receiving the other arm to rotate the second shaft.

14. A hydraulic transmission comprising a hollow, liquid-containing fly wheel rotatably mounted, a shaft, a secondary wheel rotatable within the chamber of the fly wheel and consisting of a pair of sections secured together, means within the chamber for obstructing the annular passage about the periphery of the secondary wheel, each wheel section having a radially disposed opening opposing that of the other section, said secondary wheel having transverse peripheral slots radially of the openings of the wheel sections, pairs of tubular members slidable in the opposing openings of the wheel sections and slotted at their outer ends in registry with the wheel slots, a pin connecting the tubular members of each pair, springs arranged in each tubular member, vanes slidably disposed in the slots of the wheel and tubular members and seating on the springs, a disk rotatable on the shaft and between the wheel sections and the component tubular members of each pair, said disk having cam slots through which the connecting pins pass, and a second shaft within the first shaft having a radial arm operating through a slot in the first shaft, said arm connecting with the disk to rotate the same when the second shaft is rotated.

15. A hydraulic transmission comprising a hollow, liquid-containing fly wheel, a secondary wheel rotatable therein, means within the chamber for obstructing the annular passage about the periphery of the secondary wheel, a hollow shaft supporting the secondary wheel, said secondary wheel having radial openings, vanes slidable in the latter, vane carriers movably mounted in the wheel openings, and means for moving the carriers including a member rotatable about the shaft and having connection with the carriers.

In testimony whereof I have hereunto set my hand in the presence of two subscribing witnesses.

MARTIN HVEEM.

Witnesses:
  JOHN H. HERRING,
  W. W. HEALEY.